Aug. 10, 1926.

G. F. GUNDLACH 1,595,835

GUARD FOR MEAT CHOPPERS

Filed June 27, 1925

George F. Gundlach
INVENTOR

BY Victor J. Evans
ATTORNEY

WITNESS:

Patented Aug. 10, 1926.

1,595,835

UNITED STATES PATENT OFFICE.

GEORGE F. GUNDLACH, OF BRONX, NEW YORK.

GUARD FOR MEAT CHOPPERS.

Application filed June 27, 1925. Serial No. 40,008.

This invention relates to improvements in guards for meat choppers or grinders.

The principal object of the invention resides in a guard for attachment to the hopper of a meat chopper to protect the fingers of an attendant against contact with the cutting screw or blades during the tamping of the meat to be ground when feeding the meat to the cutting screw.

Another object of the invention is to provide a guard for protecting the mouth of the hopper of a meat chopper which may be quickly applied to meat choppers now in use and which may be readily removed when access is desired within the hopper for cleaning purposes.

A further object is the provision of a guard which is simple in construction, cheap of manufacture and strong and durable for the purpose intended.

With these and other objects in view, the invention resides in certain novel construction and combination and arrangement of parts, the essential features of which are hereinafter fully described, are particularly pointed out in the appended claims, and are illustrated in the accompanying drawing, in which:—

In butcher shops, restaurants and like places where meat is ground or chopped in large quantities and even in the household, it is the natural tendency of a person in charge of the meat grinding operation to insert their hand into the hopper of the chopping machine to force the meat into engagement with the cutter. This practice sometimes results in injury to the operator due to the fingers coming in direct contact with the cutter. It is therefore my intention to provide a guard through which a tamper may be inserted for forcing the meat through the hopper, but which prevents the insertion of the hand therein.

Figure 1:
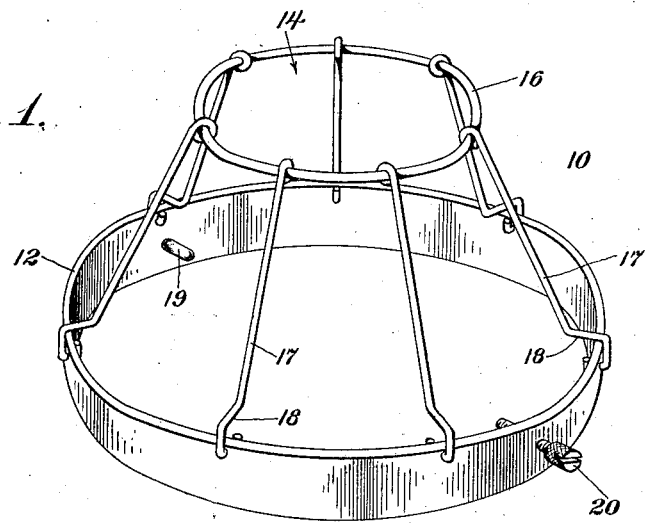
Figure 1 is a perspective view of my improved guard per se.
Figure 2:
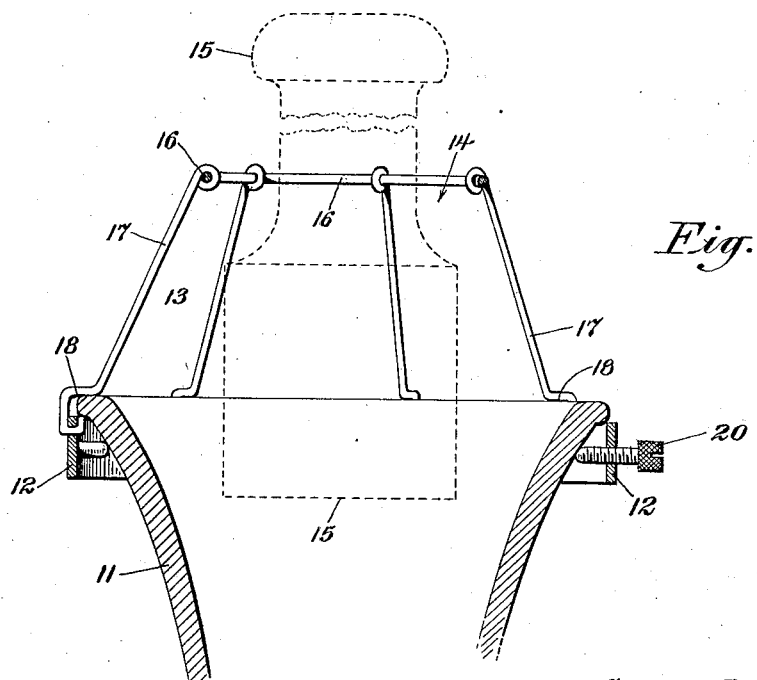
Figure 2 is a vertical sectional view through the hopper of a meat chopping machine with my improved guard in position thereon.

Referring more particularly to the drawing, the reference numeral 10 designates my improved guard in its entirety and which is shown in Figure 2 of the drawing as applied to the hopper 11 of a meat chopping machine.

The guard 10 includes an annular band or ring 12 of a size to freely pass over the mouth of the hopper and from which ring rises an inverted conical shaped frame 13. The frame 13 is provided with a restricted opening 14 therein through which the head of a tamper is inserted and which is shown in dotted lines as at 15 in Figure 2 of the drawing. The frame in the present instance is shown as constructed of wire and comprises a ring 16 of smaller diameter than the ring 12 and which is connected with the ring 12 by spaced converging members 17. The space between the members 17 allows ample view of the interior of the hopper from a position above the guard. The members are bent inwardly adjacent the ring 12 to provide shoulders 18 which rest upon the top edge of the hopper when the guard is in applied position.

For securely attaching the guard to the hopper, I provide a stationary pin 19 extending inwardly from the ring 12 and mounted diametrically opposite the pin 19, and threaded into the ring 12 is a clamping screw 20. When in applied position, the screw 20 is tightened against the side wall of the hopper and co-acts with the pin 19 for holding the guard thereon.

As above mentioned the head of the tamper 15 is adapted to be inserted through the restricted opening 14 with the handle of the tamper extending above the top of the guard. The tamper is adapted to be moved up and down to press the meat into engagement with the cutter of a chopping machine, but the fingers of the hand gripping the tamper will not be subject to the cutters for the reason that the frame limits their insertion.

While I have specifically mentioned one use of my invention, it will be readily appreciated that the same may be found useful in fruit crushers or like machines, and I therefore do not limit myself to any particular use nor anything less than the whole of my invention limited only by the appended claims.

What is claimed as new is:—

1. A guard for meat chopping machines comprising a relatively open frame having a restricted opening in the top thereof for the insertion of a tamping instrument, and attaching means for removably securing said frame to the hopper of a meat chopping machine, said means including diametrically opposed clamping elements, one of said elements being stationary and the other movable toward and away from the same.

2. In combination with the hopper of a meat chopping machine, a guard having open sides which taper from its base to the top to provide a relatively large opening in the base and a restricted opening in the top, the enlarged opening receiving the mouth of the hopper, while the restricted opening permits the insertion of a tamping instrument therethrough for tamping the meat in the hopper which is visible therein through the open sides of said frame, and means for removably attaching said guard to said hopper.

3. A guard adapted to be mounted upon the hopper of a meat chopping machine comprising an attaching ring, clamping means carried by said ring for attaching said guard to the hopper, a frame structure having relatively open sides rising from said ring and having an opening in the top thereof of a smaller diameter than said ring but in axial alignment therewith.

In testimony whereof I have affixed my signature.

GEORGE F. GUNDLACH.